United States Patent
Ver Meer et al.

(10) Patent No.: US 9,013,963 B2
(45) Date of Patent: Apr. 21, 2015

(54) FLEX CIRCUIT WITH DUAL SIDED INTERCONNECT STRUCTURE

(71) Applicant: Seagate Technology LLC, Cupertino, CA (US)

(72) Inventors: Bradley J. Ver Meer, Savage, MN (US); Ravishankar Ajjanagadde Shivarama, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/839,342

(22) Filed: Mar. 15, 2013

(65) Prior Publication Data

US 2013/0286800 A1 Oct. 31, 2013

Related U.S. Application Data

(60) Provisional application No. 61/638,473, filed on Apr. 25, 2012.

(51) Int. Cl.
| | |
|---|---|
| *G11B 11/00* | (2006.01) |
| *G11B 5/48* | (2006.01) |
| *G11B 5/60* | (2006.01) |
| *G11B 13/04* | (2006.01) |
| *G11B 5/00* | (2006.01) |

(52) U.S. Cl.
CPC ............ *G11B 13/04* (2013.01); *G11B 5/486* (2013.01); *G11B 2005/0021* (2013.01); *G11B 5/6088* (2013.01)

(58) Field of Classification Search
None
See application file for complete search history.

(56) References Cited

U.S. PATENT DOCUMENTS

| | | | |
|---|---|---|---|
| 4,761,699 | A | 8/1988 | Ainslie et al. |
| 4,789,914 | A | 12/1988 | Ainslie et al. |
| 4,990,724 | A | 2/1991 | Suppelsa et al. |
| 5,384,432 | A | 1/1995 | Noro et al. |
| 5,408,052 | A | 4/1995 | Inaba et al. |
| 5,519,552 | A | 5/1996 | Kohira et al. |

(Continued)

FOREIGN PATENT DOCUMENTS

| | | |
|---|---|---|
| WO | 98/20485 | 5/1998 |
| WO | 2011100021 A2 | 8/2011 |

OTHER PUBLICATIONS

International Search Report and Written Opinion dated Aug. 19, 2013 from International Application No. PCT/US2013/038189.

(Continued)

*Primary Examiner* — Muhammad N Edun
(74) *Attorney, Agent, or Firm* — Westman, Champlin & Koehler, P.A.

(57) ABSTRACT

A flex circuit including a dual sided interconnect structure to connect electrical components on a head or suspension assembly to head circuitry is described. The dual sided interconnect structure described has application for providing an electrical connection to one or more transducer elements on a slider and one or more elements of a heat assisted magnetic recording HAMR unit. In an illustrated embodiment, a flexible structure or insulating base layer includes one or more slider and heat assisted magnetic recording traces coupled to one or more slider or HAMR bond pads on an interconnect portion. As disclosed, the slider bond pads are on the obverse side of the flexible structure and the HAMR bond pads include a reverse side bonding surface to form reverse side bond pads to connect to one or more electrical or heating elements on the HAMR unit.

14 Claims, 7 Drawing Sheets

(56) References Cited

U.S. PATENT DOCUMENTS

| | | | |
|---|---|---|---|
| 5,687,479 | A | 11/1997 | Bennin et al. |
| 5,737,152 | A | 4/1998 | Balakrishnan |
| 5,739,982 | A | 4/1998 | Arya et al. |
| 5,768,062 | A | 6/1998 | Anderson et al. |
| 5,774,975 | A | 7/1998 | Maffitt et al. |
| 5,808,834 | A | 9/1998 | Jurgenson |
| 5,812,344 | A | 9/1998 | Balakrishnan |
| 5,850,320 | A | 12/1998 | Warmka et al. |
| 5,862,010 | A | 1/1999 | Simmons et al. |
| 5,889,636 | A | 3/1999 | Arya et al. |
| 5,896,247 | A | 4/1999 | Pan et al. |
| 5,896,248 | A | 4/1999 | Hanrahan et al. |
| 5,956,209 | A | 9/1999 | Shum |
| 5,969,906 | A | 10/1999 | Arya et al. |
| 5,986,853 | A | 11/1999 | Simmons et al. |
| 5,995,328 | A | 11/1999 | Balakrishnan |
| 6,125,015 | A | 9/2000 | Carlson et al. |
| 6,134,075 | A | 10/2000 | Bennin et al. |
| 6,351,353 | B1 | 2/2002 | Sluzewski et al. |
| 6,587,310 | B1 | 7/2003 | Bennin et al. |
| 6,714,384 | B2 | 3/2004 | Himes et al. |
| 6,717,277 | B2 | 4/2004 | Chung et al. |
| 6,925,702 | B2 | 8/2005 | Krounbi et al. |
| 6,965,499 | B1 | 11/2005 | Zhang et al. |
| 6,975,488 | B1 | 12/2005 | Kulangara et al. |
| 6,985,332 | B1 | 1/2006 | Sluzewski et al. |
| 7,348,494 | B1 | 3/2008 | Handforth et al. |
| 7,384,531 | B1 | 6/2008 | Peltoma et al. |
| 7,571,540 | B2 | 8/2009 | Aonuma et al. |
| 7,710,688 | B1 | 5/2010 | Hentges et al. |
| 7,875,804 | B1 | 1/2011 | Tronnes et al. |
| 7,929,248 | B2 | 4/2011 | Zhu et al. |
| 8,094,413 | B1 | 1/2012 | Hentges et al. |
| 8,144,429 | B2 | 3/2012 | Kato |
| 8,254,212 | B2 | 8/2012 | Snyder et al. |
| 8,259,540 | B1 | 9/2012 | Sahoo et al. |
| 8,279,558 | B2 | 10/2012 | Limmer et al. |
| 8,295,011 | B2 | 10/2012 | Chou et al. |
| 8,351,158 | B2 | 1/2013 | Zhu et al. |
| 8,411,391 | B2 * | 4/2013 | Hirata et al. ............... 360/244.1 |
| 8,411,535 | B1 | 4/2013 | Hirano et al. |
| 8,427,783 | B2 | 4/2013 | Tsuchiya et al. |
| 8,488,279 | B1 | 7/2013 | Pan et al. |
| 8,705,210 | B2 | 4/2014 | Arai |
| 2005/0095878 | A1 | 5/2005 | Palanisamy |
| 2006/0114610 | A1 | 6/2006 | Krause et al. |
| 2007/0115590 | A1 | 5/2007 | Resh et al. |
| 2007/0297094 | A1 | 12/2007 | Sassine |
| 2008/0002298 | A1 | 1/2008 | Sluzewski |
| 2008/0094753 | A1 | 4/2008 | Brodkin et al. |
| 2008/0170326 | A1 | 7/2008 | Feng et al. |
| 2009/0195930 | A1 | 8/2009 | Lille |
| 2010/0007980 | A1 | 1/2010 | Kim et al. |
| 2010/0195251 | A1 * | 8/2010 | Nojima et al. ............. 360/245.3 |
| 2012/0008470 | A1 | 1/2012 | Shimazawa et al. |
| 2012/0044790 | A1 | 2/2012 | Shimazawa et al. |
| 2012/0045662 | A1 | 2/2012 | Zou et al. |
| 2012/0050917 | A1 | 3/2012 | Limmer et al. |

OTHER PUBLICATIONS

Peter Macleod: "A Review of Flexible Circuit Technology and Its Applications", PRIME Faraday Partnership, 2002, XP002710090, Retrieved from the Internet: URL:http://www.lboro.ac.uk/microsites/mechman/research/ipm-ktn/pdf/Technology_review/flexible-circuit-technology-and-its-applications.pdf.

International Search Report and Written Opinion dated Jul. 24, 2013 from International Application No. PCT/US2013/038187.

Restriction Requirement for U.S. Appl. No. 13/840,197, dated Jan. 27, 2014, 6 pages.

Office Action for U.S. Appl. No. 13/840,197, dated May 29, 2014, 7 pages.

Notice of Allowance for U.S. Appl. No. 13/840,197, dated Sep. 11, 2014, 5 pages.

\* cited by examiner

FLEX CIRCUIT WITH DUAL SIDED INTERCONNECT STRUCTURE

CROSS-REFERENCE TO RELATED APPLICATION

This application claims priority to and the benefit of U.S. Provisional Application No. 61/638,473 filed on Apr. 25, 2012 for "Single Layer Flex Circuit Solution with Backside Exposed Copper for Laser on Slider HAMR Design", the contents of which is hereby incorporated into the present application in its entirety.

BACKGROUND

Data storage devices store digitally encoded data on discs or other magnetically encoded media. Demand for increased data storage has resulted in demand for higher recording density. Heat assisted magnetic recording uses heating elements or lasers to apply heat to the magnetic media to enhance recording density. The addition of heat assisted magnetic recording has increased the required number of traces and bond pads on flex circuits interconnecting electrical components on the head or suspension assembly to head circuitry. Embodiments of the present invention provide solutions to these and other problems, and offer other advantages over the prior art. The background description provides a general description of the art and is not intended to limit the claims to a particular problem or solution.

SUMMARY

The present application relates to a flex circuit including a dual sided interconnect structure to connect electrical components on a head or suspension assembly to head circuitry. As described, the dual sided interconnect structure has application for providing an electrical connection to one or more transducer elements on a slider and one or more elements of a heat assisted magnetic recording HAMR unit. In an illustrated embodiment, the flex circuit includes a flexible structure or insulating base layer having one or more slider and heat assisted magnetic recording HAMR traces. The traces are coupled to one or more slider or HAMR bond pads on an interconnect portion of the flex circuit. In illustrated embodiment, the slider bond pads are on the obverse side of the flexible structure and the HAMR bond pads include a reverse side bonding surface to form reverse side bond pads to connect to one or more electrical or heating elements on the HAMR unit.

In illustrated embodiments, the slider and HAMR traces are formed on an obverse side of the flexible structure and one or more slider and HAMR traces are coupled to the obverse side or reverse side bond pads through conductive paths along the reverse side of the flexible structure. In illustrated embodiments, multiple traces are interleaved on the flexible structure through reverse side traces or paths to increase interconnect connections without increasing form factor dimensions. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
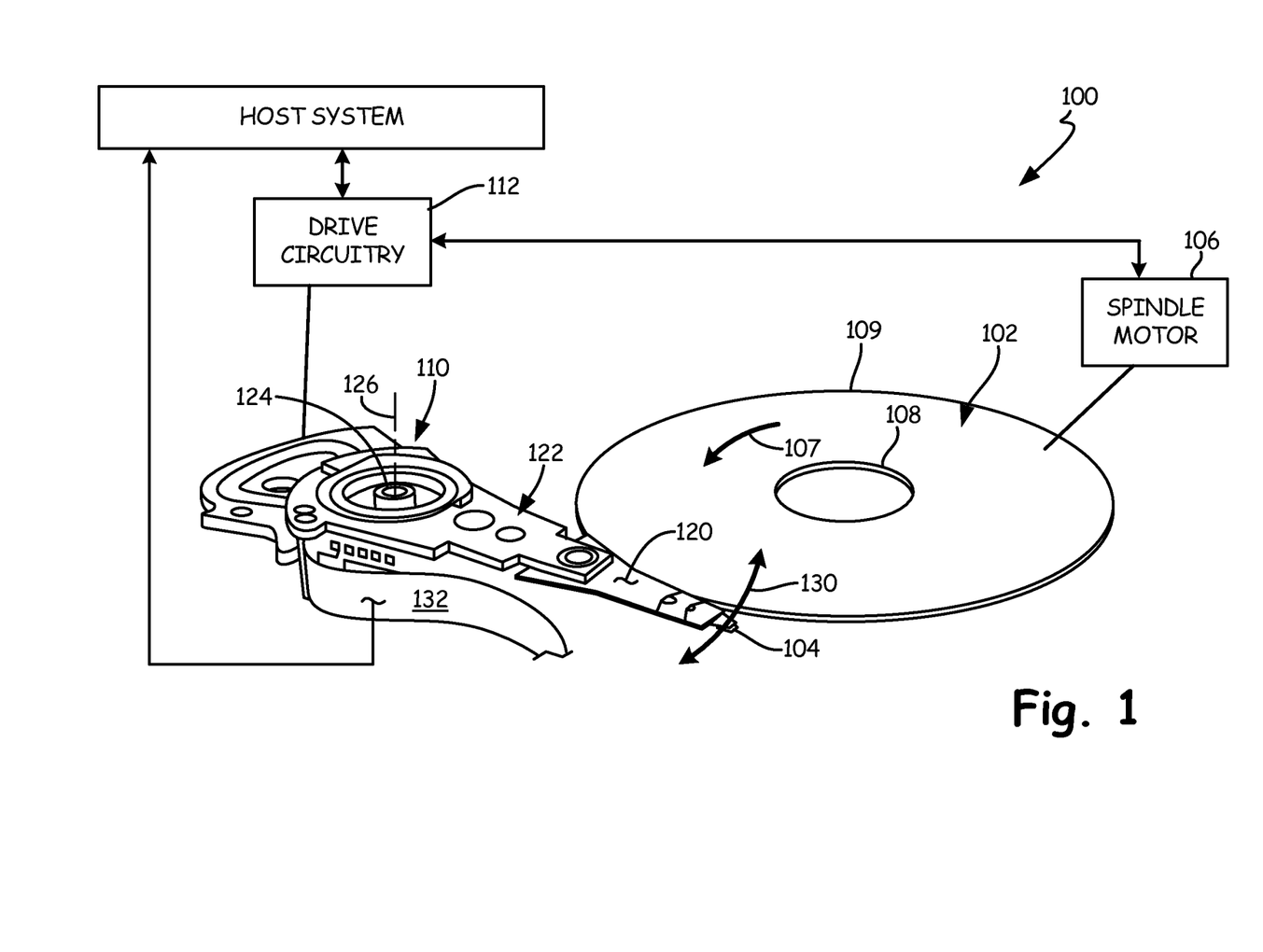
FIG. 1 is a schematic illustration of a data storage device in which embodiments of the present application can be used.

The present application relates to a flex circuit having application for providing an electrical connection to transducer or electrical components of a data storage device of the type illustrated in FIG. 1. The data storage device 100 shown in FIG. 1 includes a data storage media 102 to store digitally encoded data. A head assembly 104 is positioned above the media 102 to read data from and/or write data to the data storage media 102. In the embodiment shown, the data storage media 102 is a rotating disc. For read and write operations, a spindle motor 106 (illustrated schematically) rotates the media 102 as illustrated by arrow 107 and an actuator mechanism 110 positions the head assembly 104 relative to data tracks on the rotating media 102 between an inner diameter 108 and an outer diameter 109 of the rotating media. Both the spindle motor 106 and actuator mechanism 110 are connected to and operated through drive circuitry 112 (schematically shown). In the illustrated embodiment, the head assembly 104 includes one or more transducer elements (not shown in FIG. 1) to read or write data to the data storage media 102.

Figure 2:
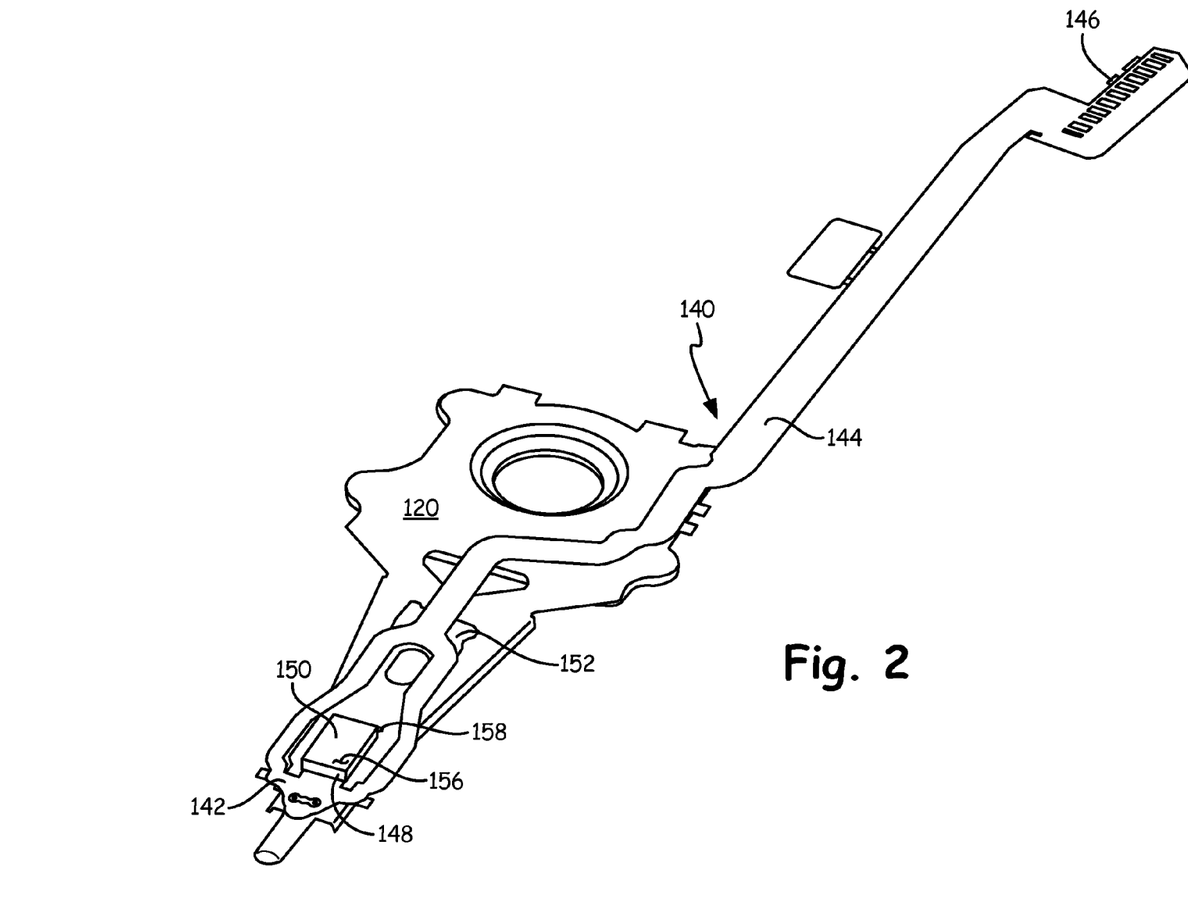
FIG. 2 illustrates an embodiment of a flex circuit utilizing a dual sided interconnect structure.

The head assembly 104 is coupled to the actuator mechanism 110 through a suspension assembly. As shown in FIG. 2, the suspension assembly includes a load beam 120 connected to an actuator arm 122 of the mechanism 110 for example through a swage connection. Although FIG. 1 illustrates a single load beam coupled to the actuator mechanism 110, additional load beams and head assemblies 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head assembly 104 in a cross track direction as illustrated by arrow 130. The one or more transducer elements of the head assembly 104 are electrically coupled to head circuitry 132 to encode data on the data storage media 102 and decode data from the data storage media 102 through a flex circuit 140 of the type illustrated in FIG. 2.

The flex circuit 140 includes a flexible structure including an interconnect portion 142 and a tail portion 144. A plurality of traces are formed along the length of the flex circuit 140 to electrically connect transducer or electrical elements on the head assembly 104 to head circuitry 132 to form a connecting portion and interconnecting portion to interface with elements of the head assembly 104 along the length of the flex circuit 140. The traces are connected to head circuitry 132 through contacts 146 on tail portion 144. In an illustrated embodiment, the head assembly includes one or more transducer elements (not shown in FIG. 2) fabricated on a trailing edge 148 of a slider or slider body 150. The slider is coupled to the load beam 120 through a gimbal spring 152. Rotation of the media creates an air flow along an air bearing surface (ABS) 156 of the slider from a leading edge 158 to the trailing edge 148 of the slider to read from and write data to the media.

Figure 3:
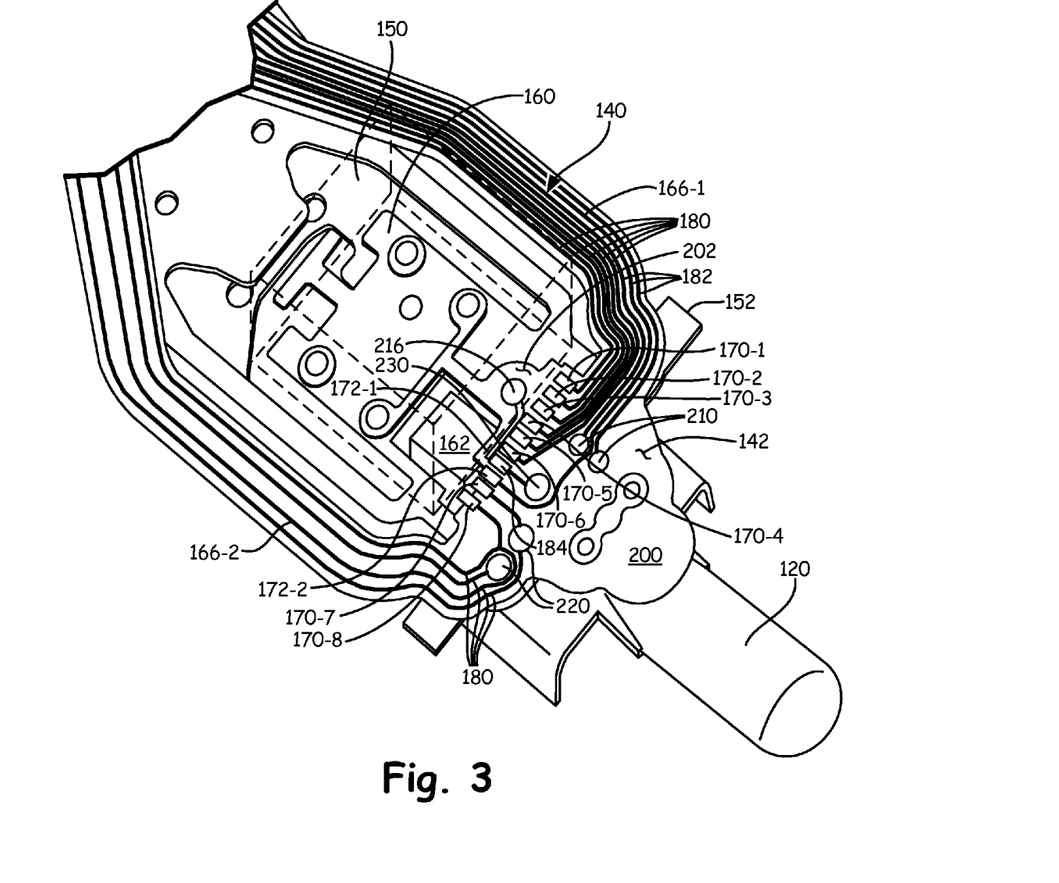
FIG. 3 is a detailed illustration of an interconnect portion of an embodiment of a flex circuit including multiple traces and bond pads connectable to one or more transducer elements on a slider and one or more heating or HAMR elements.

FIG. 3 is a detailed illustration of an embodiment of the head assembly 104 and interconnect portion 142 of the flex circuit 140. As shown, the head assembly 104 includes the slider 150 (shown in phantom) coupled to a tab portion 160 of the gimbal spring 152 and a HAMR unit or structure 162 coupled to the slider 150 to implement heat assisted magnetic recording. In the embodiment shown, the HAMR unit or structure 162 is mounted on an back surface of the slider 150 opposite to the air bearing surface 156 shown in FIG. 2. The HAMR unit or structure 162 includes one or more heating or HAMR elements such as a laser diode and/or heat source to deliver heat to the media through a wave guide (not shown) fabricated on the slider 150 to enhance magnetic recording. The interconnect portion 142 shown in FIG. 3 includes slider bond pads and HAMR bond pads fabricated on a flexible structure of the flex circuit to electrically connect the transducer elements on the slider and HAMR or heating elements on the HAMR unit to the traces on the flex circuit 140. In the illustrated embodiment, the flex circuit includes arms 166-1, 166-2 that extend along opposed sides of the slider 150 and connect to the interconnect portion 142 of the flex circuit 140 at ends thereof.

In the illustrated embodiment arms 166-1, 166-2 include a plurality of slider traces and a plurality of HAMR traces that connect to slider bond pads 170-1 through 170-8 and HAMR bond pads 172-1 through 172-2 on the interconnect portion 142. In particular, bond pads 170-1 through 170-6 are coupled to slider traces 180 along arm 166-1 and bond pads 170-7-170-8 are coupled to slider traces 180 along arm 166-2. Bond pads 172-1 through 172-2 are coupled to traces 182 along arm 166-1 and bond pad 184 is coupled to ground through a ground plate terminal. As shown in the illustrated embodiment, the interconnect portion includes a trailing end segment 200 forward of the trailing edge of the slider and an in-between segment 202 between the slider 150 and the gimbal spring 152. Bond pads 170-1 through 170-8 for the slider and ground 184 are formed along the trailing edge segment 200 proximate to trailing edge bond pads of the slider. Bond pad 172-2 for the HAMR unit is located along the trailing end segment 200 and bond pad 172-1 is located along the in-between segment 202 to provide space to connect the HAMR traces to HAMR heating elements. Although a particular number of slider and HAMR bond pads and traces is shown, application is not limited to the particular number shown.

Figure 4A:
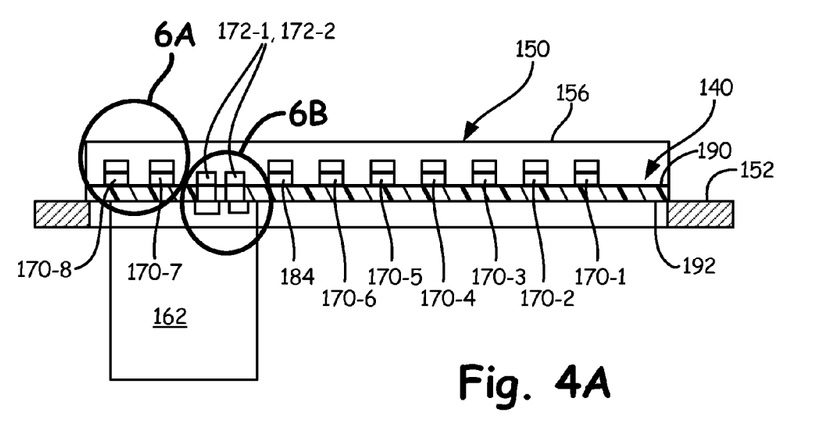
FIG. 4A is a cross sectional view illustrating a flex circuit including obverse and reverse side bond pads connectable to one or more slider and HAMR bond pads to electrically interface with one or more slider transducer elements and/or HAMR elements.
Figure 4B:
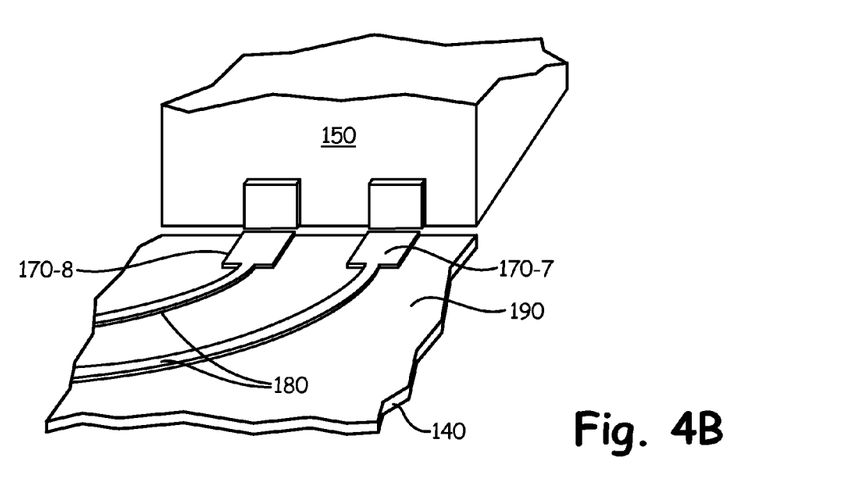
FIG. 4B is a detailed illustration of obverse side bond pads coupled to traces on a flexible structure of the flex circuit.
Figure 4C:
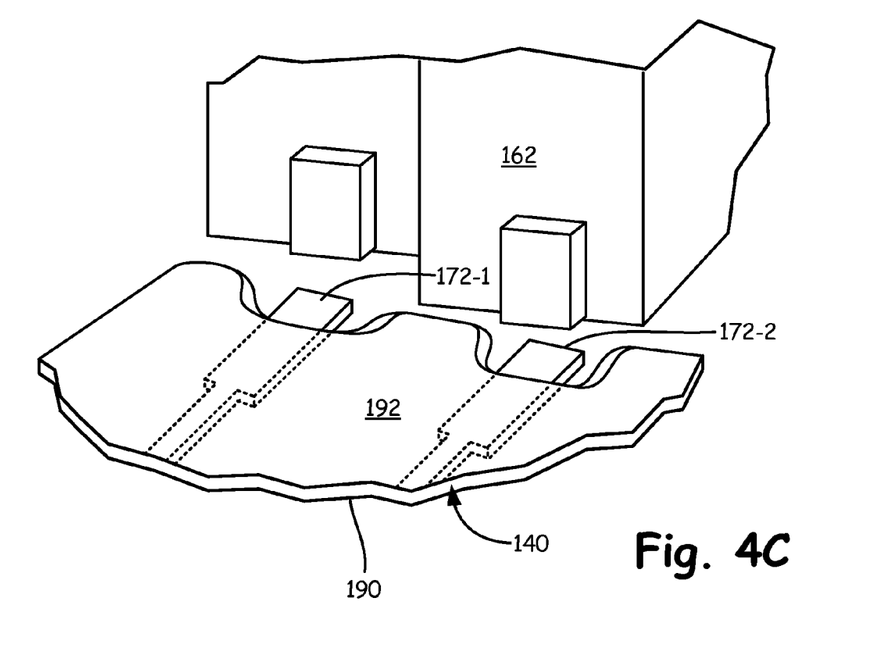
FIG. 4C is a detailed illustration of reverse side bond pads coupled to traces on the flexible structure of the flex circuit.

As shown in FIG. 4A, the flexible structure of the flex circuit 140 includes an obverse side 190 and a reverse side 192. The obverse side 190 faces towards the ABS 156 so that the obverse side 190 of the in-between segment 202 interfaces with the backside of the slider 150. The reverse side 192 of the flexible structure faces away from the ABS 156 toward the HAMR unit so that the in-between segment 202 interfaces with the gimbal spring 152. In the illustrated embodiment, the flexible structure is formed of a single insulating base layer having traces 180, 182 formed on the obverse side 190 thereof. Obverse side bond pads 170-1 through 170-8 are formed on the obverse side of the flexible structure to form the slider bond pads and connect to transducer elements on the slider through solder connections to pads on the slider as shown in FIG. 4B. Reverse side bond pads 172-1 through 172-2 have a reverse side bonding surface open or exposed to the reverse side 192 of the flex circuit 140 as shown in FIG. 4C to form the HAMR bond pads coupled to obverse side HAMR traces 182.

In particular, as shown, the reverse side bond pads 172-1 through 172-2 protrude from an edge of the flexible structure or base layer at opening to form the reverse side bonding surface. As schematically shown, HAMR elements are coupled to the reverse side bond pads through a solder connection between HAMR pads and the reverse side bonding surface of the reverse side bond pads 172-1 and 172-2. Thus, as described, the transducer elements of the slider 150 are connected to traces 180 on the flex circuit through observe side bonding surfaces and one or more HAMR elements are connected to traces 182 on the flex circuit through reverse side bonding surfaces. Although an illustrated embodiment of the flexible insulating structure includes a single base layer application is not limited to the particular embodiment shown and alternate embodiments include other flexible insulating structures including obverse and reverse side bond pads as described.

Figure 5A:
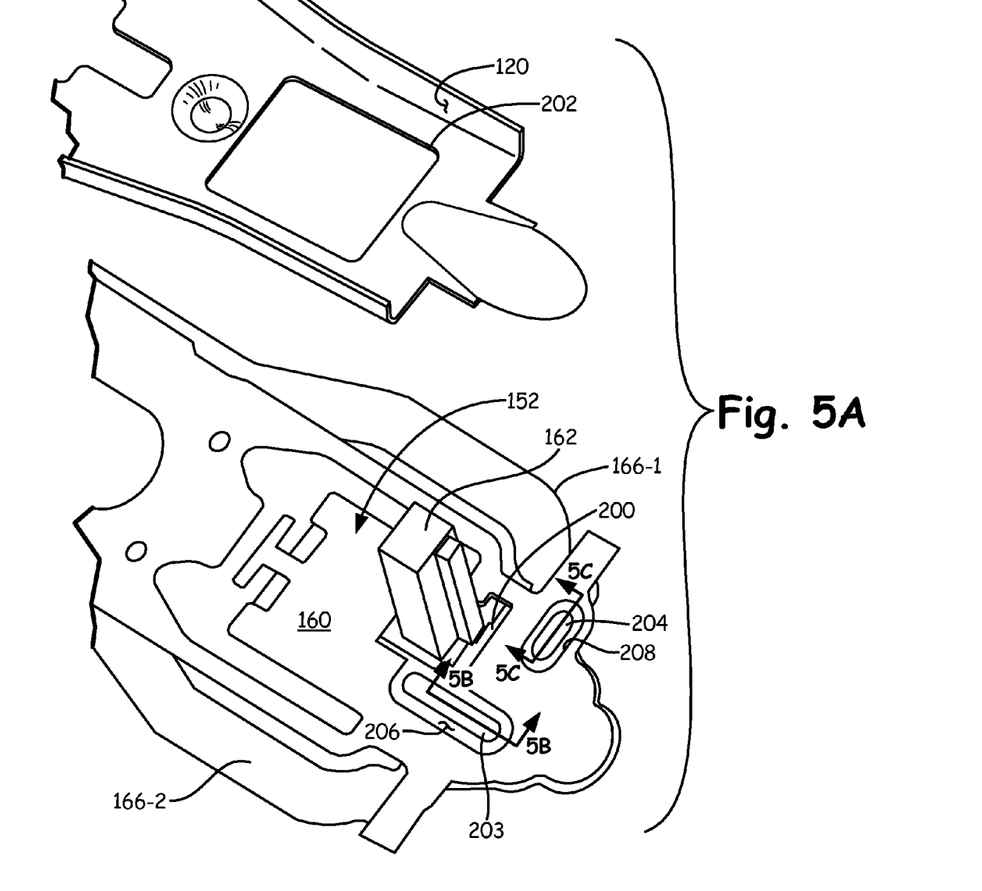
FIG. 5A illustrates a back side of the slider coupled to gimbal spring and shown with the load beam exploded from the gimbal spring.

FIG. 5A is a top side view of the gimbal spring 152 and slider 150 shown with the load beam 120 exploded from the gimbal spring 152. As shown, the backside of the slider 150 is mounted to the tab portion 160 of the gimbal spring 152. The HAMR unit 162 is mounted to the backside of the slider 150 and extends through opening 200 for the HAMR unit or structure through the gimbal spring 152 and opening 202 through the load beam 120. As previously illustrated traces 180, 182 and bond pads are fabricated on the obverse side of the flex circuit and the reverse side bond pads 172-1, 172-2 protrude from an edge surface of the flexible structure to provide a reverse side bonding surface for connection to the HAMR elements.

As shown in FIG. 5A, the reverse side of the flex circuit includes conductive plates 203, 204 disposed in cutout regions 206, 208 of the gimbal spring 152. The plates 203, 204 are insulated from the spring by the cutout regions 206, 208 to provide a conductive path along the reverse side of the flex circuit to connect traces on the flex circuit 140 to obverse or reverse side bond pads 170, 172 . The conductive plates 203, 204 are formed of a stamped metal portion of the gimbal spring 152 and are disposed in the cutout openings 206, 208 and spaced from the main body of the gimbal spring to insulate the paths from the main body of the gimbal spring 152 . The reverse side plates 203, 204 provide a reverse side conductive path for traces 180, 182 to bond pads 170-7, 172-1.

Figure 5B:
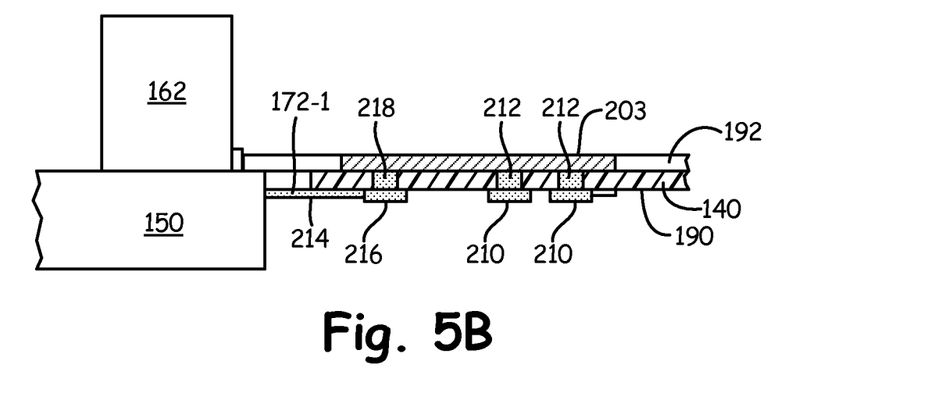
FIG. 5B is a cross-sectional view taken along line 5B-5B of FIG. 5A.

In particular, plate 203 provides a reverse side conductive path between HAMR traces 182 and bond pad 172-1 as shown in FIG. 5B. As shown in FIG. 5B, multiple HAMR traces 182 on arm 166-1 are coupled to reverse side bond pad 172-1 through conductive plate 203. The traces are coupled to plate through vias terminals 210 connected to conductive vias 212 extending through the flexible structure. As shown in FIG. 5B the conductive plate 203 is coupled to an interconnecting trace 214 between the conductive plate 203 and the reverse side bond pad 172-1 at vias terminal 216 through via 218 between the reverse side and the obverse side of the flexible structure. As previously shown in FIG. 3, in the illustrated embodiment, interconnecting trace and vias terminal 216 are located along the in-between portion 202 of the flex circuit between the slider 150 and gimbal spring 152 to provide a reverse bonding surface proximate to the HAMR unit 162 to connect the HAMR traces 182 to HAMR elements.

Figure 5C:
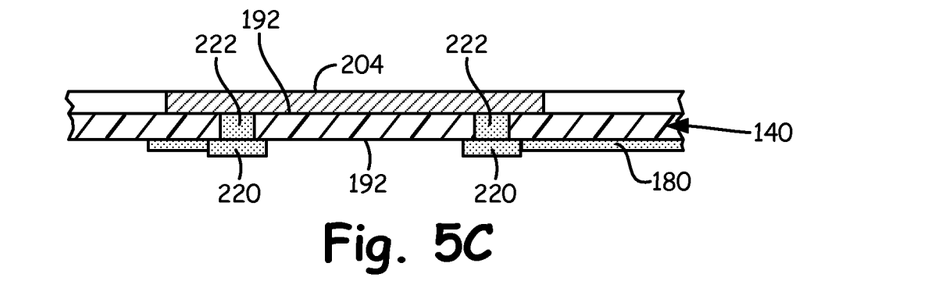
FIG. 5C is a cross-sectional view taken along line 5C-5C of FIG. 5A.

FIG. 5C is a cross-sectional view taken along line 5C-5C of FIG. 5A illustrating connection of slider traces to conductive plate 204 on the reverse side of the flexible structure. As shown, slider traces 180 are coupled to plate 204 at vias terminals 220 shown in FIG. 3 to interleave multiple traces to bond pad 170-7 through conductive plate 204. As shown the vias terminals 220 provide the connection between the traces and the conductive plate 204 through conductive vias 222 extending through the flexible structure 140. Bond pad 170-7 as shown in FIG. 3 is coupled to the conductive plate or path 204 of the reverse side though an interconnecting trace between the bond pad 170-7 and the conductive plate or path 204 on the reverse side 192.

Figure 5D:
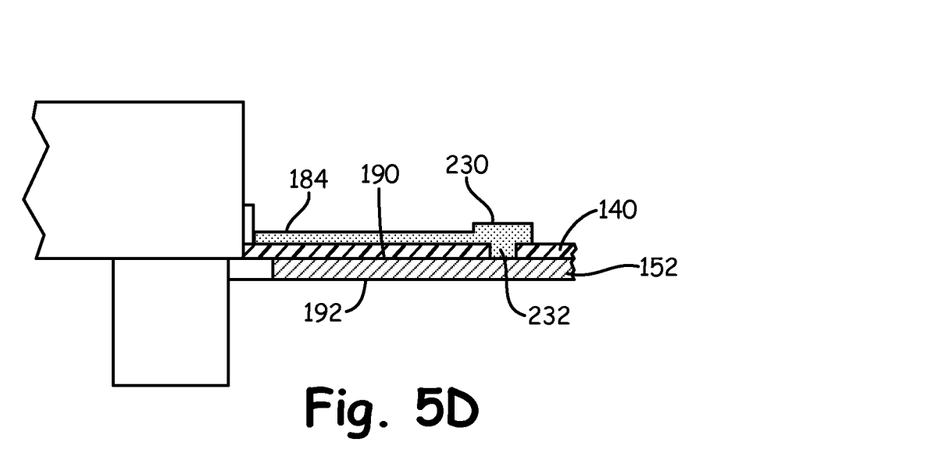
FIG. 5D is a cross-sectional view illustrating connection of a ground bond pad to ground through a gimbal spring.

FIG. 5D is a cross-sectional view illustrating connection of ground bond pad 184 to the conductive gimbal plate 152 through a vias terminal 230. As shown, the bond pad 184 is conductively coupled to the conductive gimbal plate through conductive vias 232 extending the flexible structure providing a connection between ground trace coupled to the bond pad 184 and the conductive gimbal plate 152 as shown. The flexible structure of the flex circuit described typically includes a polyimide insulating base layer, however other insulating or dielectric base layers can be used to form the flexible structure. Traces and bond pads are typically formed of copper or other conductive material. In an illustrated embodiment the flexible structure includes a cover layer to protect the traces along the flex circuit 140.

The traces and obverse and reverse side bond pads described herein are formed using known deposition, masking and etching techniques. In particular, in an illustrated embodiment, traces and bond pads are etched from a conductive layer deposited on an insulating base layer. The base layer is etched to form the reverse side bonding surface protruding from an edge surface of the insulating base layer as described.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the term s in which the appended claims are expressed. For example, the particular elements may vary depending on the particular application while maintaining substantially the same functionality without departing from the scope and spirit of the present invention. In addition, although the preferred embodiment described herein is directed to an interconnect for a slider and HAMR unit, it will be appreciated by those skilled in the art that the teachings of the present invention can obverse and reverse side interconnects for other head components or transducer elements, without departing from the scope and spirit of the present invention.

What is claimed is:

1. A flex circuit comprising
   a flexible structure having an obverse side and a reverse side;
   an obverse side bond pad on the flexible structure coupled to a conductive slider trace and connectable to a transducer element on a slider; and
   a reverse side bond pad on the flexible structure including a reverse side bond pad surface coupled to a conductive HAMR trace and connectable to a heat assisted magnetic recording HAMR element,
   wherein the slider and HAMR traces are on the obverse side of the flexible structure, and
   wherein the reverse side bond pad protrudes from a recessed edge of the flexible structure to expose the reverse side bond pad surface for connection to the HAMR element.

2. The flex circuit of claim 1 wherein the reverse side bond pad is coupled to the HAMR trace through a reverse side conductive path on the reverse side of the flexible structure.

3. The flex circuit of claim 2 wherein the reverse side conductive path is formed of a metal plate connected to the HAMR trace through conductive vias extending through the flexible structure between the obverse and reverse side.

4. The flex circuit of claim 1 wherein at least one of the obverse or reverse side bond pads is coupled to one of the slider or HAMR traces through a reverse side conductive path connected to the slider or HAMR trace through a conductive via extending through the flexible structure.

5. The flex circuit of claim 4 comprising an obverse side interconnecting trace between the at least one bond pad and the reverse side conductive path.

6. The flex circuit of claim 1 wherein the flexible structure includes a plurality of slider traces and a plurality of HAMR traces and the flexible structure includes a plurality of obverse side bond pads coupled to the plurality of slider traces and a plurality of reverse side bond pads coupled to the plurality of HAMR traces.

7. The flex circuit of claim 1 wherein the flex circuit includes spaced arm potions having the slider and HAMR traces and the arm portions connecting to the flexible structure including the obverse and reverse side bond pads coupled to the first and second conductive traces.

8. The flex circuit of claim 1 wherein a plurality of slider or HAMR traces are interleaved to the obverse or reverse side bond pad through a conductive path on a reverse side of the flexible structure.

9. The flex circuit of claim 8 wherein the slider and HAMR traces are formed on the obverse side of the flexible structure and the plurality of slider and HAMR traces are coupled to the obverse or reverse side bond pads through a conductive path on the reverse side of the flexible structure.

10. An assembly comprising;
    a slider including one or more transducer elements;
    a HAMR unit including one or more HAMR elements;
    a flex circuit including flexible insulating structure having an obverse side and a reverse side including one or more slider traces and one or more HAMR traces;
    at least one obverse side bond pad coupled to the one or more slider traces; and
    at least one reverse side bond pad including a reverse side bonding surface coupled to the one or more HAMR traces,
    wherein the one or more slider traces and the one or more HAMR traces are formed on the obverse side of the flex circuit and the reverse side bond pad protrudes from an edge surface of the flexible insulating structure to expose the reverse side bonding surface.

11. The assembly of claim 10 wherein at least one of the obverse or reverse side bond pads is coupled to one or more of the slider or HAMR traces through a conductive path on the reverse side of the flexible insulating structure.

12. The assembly of claim 11 wherein multiple slider or HAMR traces are interleaved to one of the obverse or reverse side bond pads through the conductive path on the reverse side of the flexible insulating structure.

13. An assembly comprising;
a slider including one or more transducer elements;
a HAMR unit including one or more HAMR elements;
a flex circuit including flexible insulating structure having an obverse side and a reverse side including one or more slider traces and one or more HAMR traces;
at least one obverse side bond pad coupled to the one or more slider traces; and
at least one reverse side bond pad including a reverse side bonding surface coupled to the one or more HAMR traces,
wherein at least one of the reverse or obverse side bond pads is coupled to the slider or HAMR trace through a reverse side conductive via coupled to the trace through a conductive path extending through the flexible insulating structure and comprising an obverse side interconnecting trace between the bond pad and the conductive path on the reverse side.

14. The assembly of claim 13 wherein the conductive path on the reverse side is formed of a metal plate disposed in a cutout region of a gimbal spring spaced from cut out edges of the gimbal spring to form an insulated conductive region along the reverse side of the flexible insulating structure.

\* \* \* \* \*